United States Patent
Terasaki et al.

(10) Patent No.: US 6,292,863 B1
(45) Date of Patent: Sep. 18, 2001

(54) PC CARD

(75) Inventors: Yukio Terasaki, Chiba; Hiroshi Karibe, Matsudo, both of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/201,904

(22) Filed: Nov. 30, 1998

(30) Foreign Application Priority Data

Jan. 8, 1998 (JP) ................................ 10-002228
Sep. 29, 1998 (JP) ................................ 10-275297

(51) Int. Cl.[7] .............................. G06F 13/00; G06F 13/38
(52) U.S. Cl. .......................... 710/129; 710/36; 710/38; 710/101; 710/102; 710/126; 710/131; 713/300; 713/310; 713/330; 713/340
(58) Field of Search .................. 710/102, 131, 710/101, 129, 126, 36, 38; 713/300–340

(56) References Cited

U.S. PATENT DOCUMENTS

| | | | |
|---|---|---|---|
| 4,807,282 | 2/1989 | Kazan et al. | 379/284 |
| 5,167,024 | 11/1992 | Smith et al. | |
| 5,550,861 | 8/1996 | Chan et al. | |
| 5,655,106 | 8/1997 | Smith | 395/500 |
| 5,778,195 | * 7/1998 | Gochi | 710/102 |

FOREIGN PATENT DOCUMENTS

| | | |
|---|---|---|
| 0 723 232 A1 | 7/1996 | (EP) . |
| 2 302 744 A | 1/1997 | (GB) . |
| A-7-50663 | 2/1995 | (JP) . |
| A-7-302140 | 11/1995 | (JP) . |
| A-9-244821 | 9/1997 | (JP) . |

OTHER PUBLICATIONS

"New bus standard for the use of the peripheral of PC", *Interface*, pp. 103, Jan. 1997.

* cited by examiner

Primary Examiner—Rupal Dharia
(74) Attorney, Agent, or Firm—Oliff & Berridge, PLC

(57) ABSTRACT

The present invention relates to a PC card detachably installed and used for an information processing device such as a personal computer, digital-still-camera and so on to process a variety of information and its objects is to provide a PC card connectable to a plurality of information processing devices without losing the advantages of easy detachability, flexibility and portability originally owned by the PC card. A structure is formed to provide a first interface section 100 to execute data transfer between a function block supplying a predetermined function for information processing device and a portable PC (omitted in FIG. 1), and a second interface section 101 having a different interface specification from the first interface section to transfer data between the function block 2 and a desktop PC 10.

5 Claims, 4 Drawing Sheets

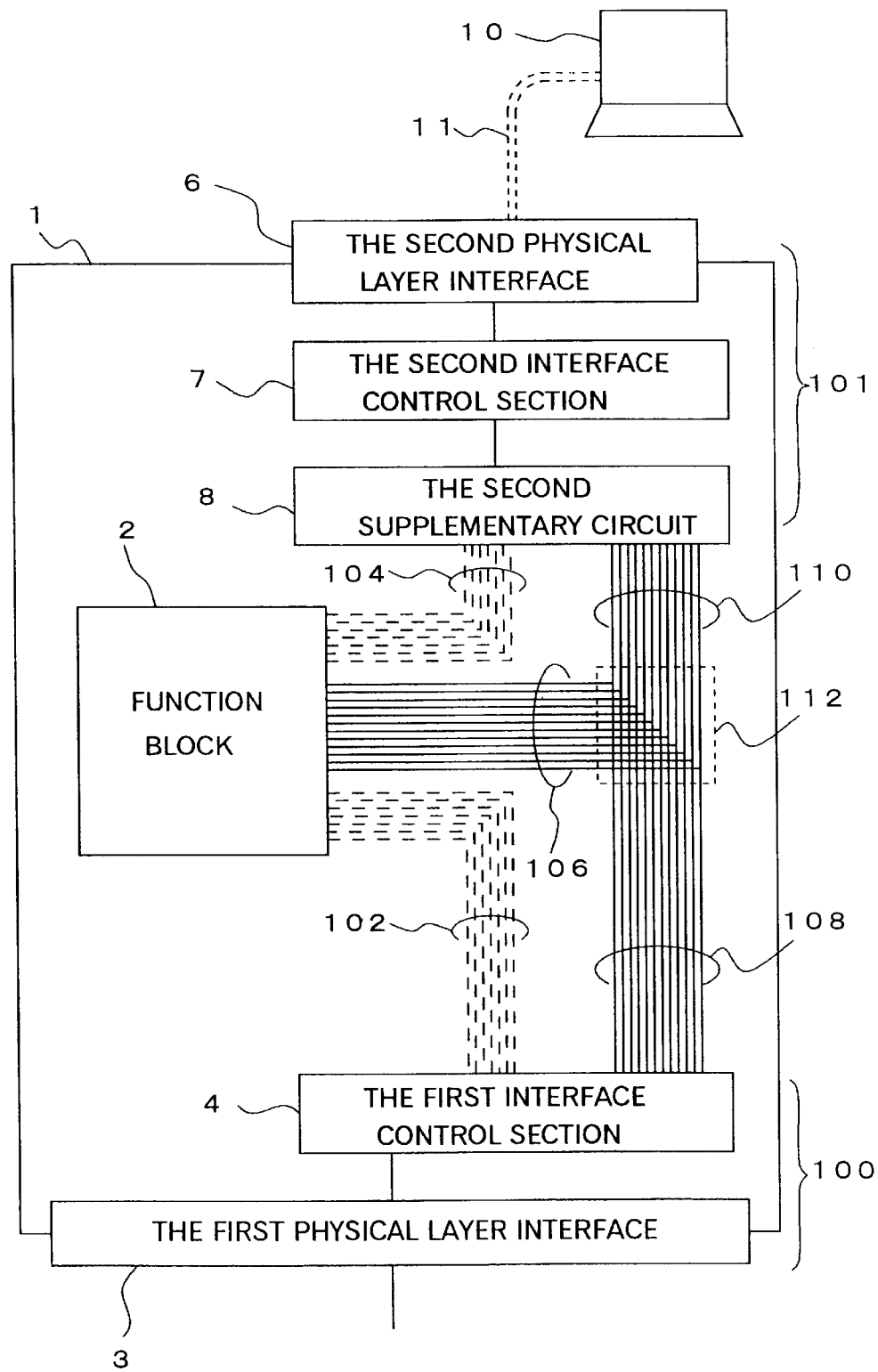
F I G . 1

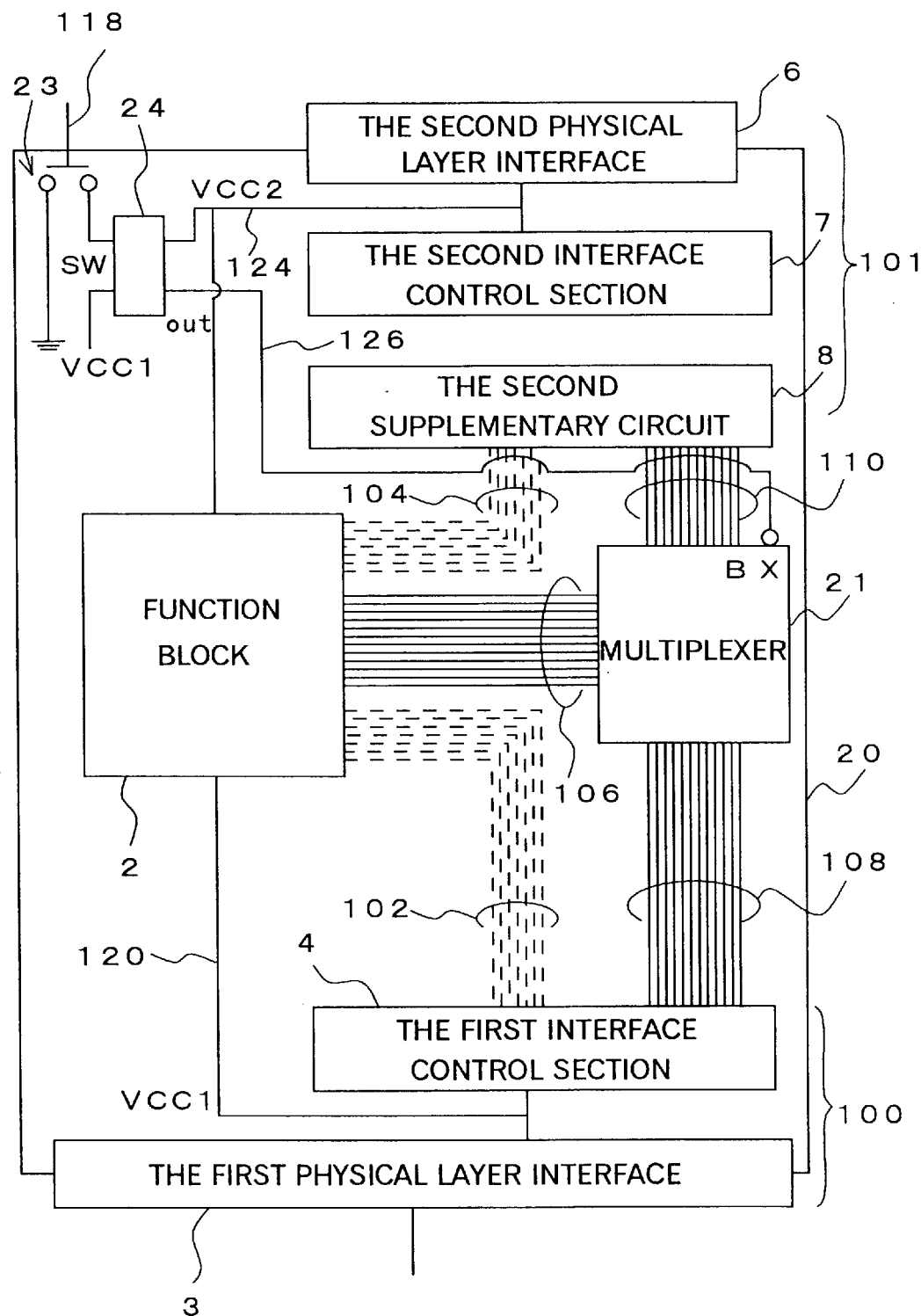
F I G . 2

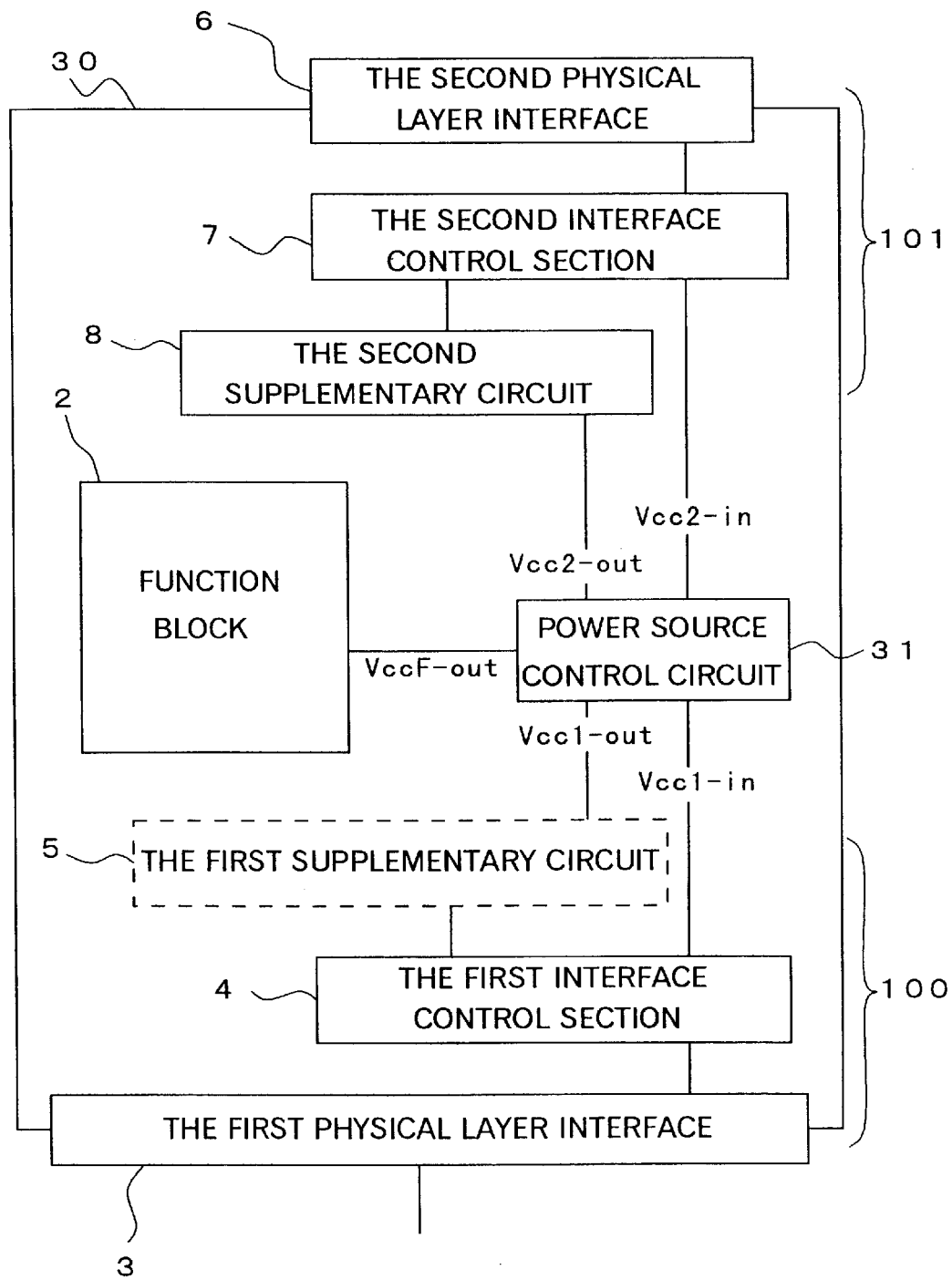
F I G . 3

PC CARD

BACKGROUND OF THE INVENTION

1. Field of the invention

The present invention relates to a PC card detachably installed and used for information processing devices, such as a personal computer or a digital-still-camera, to process a variety of information.

2. Description of the Related Art

A PC card is detachably installed and used for information processing devices, such as a personal computer (an abbreviated name "PC" is used hereinafter) or a digital-still-camera, to process a variety of information of characters, voices or images, and also used for an increase in ability of a variety of processes and an expansion in processing function for the information processing devices.

Originally, the PC card has been internationally standardized based on a unified standard (PC Card Standard) published by the PCMCIA (the Personal Computer Memory Card International Association) which is an association established to form a card device standard for the PC, and utilized mainly for a portable compact PC such as a notebook PC or PDA. Physical specification (a visual shape) of the PC card is a card type with a length of 85.6 mm and a width of 54.0 mm and classified in type I, type II and type III depending on the difference of thickness. A two-piece connector with 68 pins is used for a PC card connector. The PC card is used by inserting the connector in a PC card slot of a PC card interface provided in the portable PC and the like and can be pulled up from the PC card slot when it is not used.

Thus, since the PC card is easily detachable and superior in portability due to its compact size, the application has been spreading not only to a semiconductor memory card as an auxiliary storage, but also to the auxiliary storage having a hard disk device such as a magnetic disk, and to the related field of communication and network such as a modem function or a LAN function (Local Area Network). Further, the field of application for the use of the PC card has been spreading without being limited to the portable compact PC. For example, by being used for a digital image information processing device such as a digital-still-camera, the PC card is used as a image storage detachable and superior in portability or as a data transfer device (for example: a LAN card or a Modem card) to transfer the memorized images in the camera to the PC and the like.

Conventionally, it has been required to install an extension board with a predetermined function in an extension bus slot or to install an internal substrate module connecting to the mother board of the PC to provide a desired processing ability or processing function to the information processing device, so involving difficulties in exchange and portability of the substrate. However, with the PC card, the desired processing ability and function are instantly provided by exchanging the PC card to insert in the slot, therefore providing an advantage of easiness in handling. It should be noted that there are several methods such as pulling and inserting or placing to cramp for attaching/detaching the PC card to/from the information processing device.

Recently, along with the development of high integration technology of semiconductor devices, the development of the information processing devices including a more compact PC, digital-still-camera, digital video camera, or commercial equipment such as portable audio equipment results in a demand for the emergence of the more compact PC card, in addition to the emergence for the conventional PC card based on the PCMCIA standard intended for the use of the portable PC. Therefore, the following standards for the compact memory card are proposed and actually appear in the market as products.

The first standard is the "Compact Flash (the registered trademark of SanDisk Corporation)" proposed by the CFA (Compact Flash Association). It is a compact flash memory card with approximately 8 MB in capacity having an outside dimension of $36.4 \times 42.8 \times 3.3$ mm$^3$. The second standard is the "Small PC Card" proposed by Matsushita Battery Industrial Co., Ltd., the JEIDA (the Japan Electronic Industry Development Association) and the PCMCIA, having an outside dimension of $45.0 \times 42.8 \times 5.0$ mm$^3$ with approximately a half-length of the conventional PC card. The third standard is the "Miniature Card" proposed by the Miniature Card Implementers Forum and the PCMCIA, with an outer dimension of $38 \times 33 \times 3.5$ mm$^3$.

The fourth standard is the "SmartMedia (the registered trademark of Toshiba Corporation)" by the SSFDC Forum. This is a flash EEPROM card with a capacity of approximately 2~16 MB having an outside dimension of $37 \times 45 \times 0.67$ mm$^3$. The fifth standard is the "MMC (MultiMedia card)" proposed by the MultiMedia Card Association. This is a flash EEPROM card with, for example, approximately 10 MB in capacity having an outside dimension of $24 \times 32 \times 1.4$ mm$^3$. A sixth standard is the "Memory Stick (the trademark of Sony Corporation)" proposed by Sony Corporation. This is an EEPROM with, for example, a capacity of approximately 8 MB having an outside dimension of $21.5 \times 50 \times 2.8$ mm$^3$. Moreover, a compact PC card with a hard disk drive using magnetic storage is also developed. In this application, each of the compact cards having the aforementioned functions including the similar cards is generally named a PC card.

The object of the PC card is to solve the problems regarding the insufficiency of compatibility among the IC cards as well as the limitation of the extension of the use and the function, which have been in the past owned by the IC card used mainly for the purpose of exchange of a card having magnetic stripes, and further the PC card is realized by newly forming physical specification, electric specification and software specification to extend the processing ability and processing function of the PC and the like. In short, though the PC card has its origin in an IC memory card, it is significantly different from the IC memory card in mechanism and application. Furthermore, it can be referred as an extended function card standardized and realized by electric specification and software specification which are strongly influenced by a PC extension bus architecture. Thus, the application field and technical field are new industrial utility and technical fields which can provide functions far beyond the range of the market intended originally in the IC card.

SUMMARY OF THE INVENTION

As has been previously described, the PC card exhibits the predetermined functions by being inserted in the slot of the PC card interface provided in the information processing device such as the PC and digital-still-camera. And a method to use the PC card in the information processing device which is, for example, not ordinarily equipped with the PC card interface like a host computer system which does not have a portability as a desktop, is described bellow.

For example, Japanese Laid-open Patent Application No.7-302140 discloses to make the PC card function from the information processing device by preparing a PC card interface unit having an PC card interface therein, connecting the unit to the information processing device, and inserting the PC card in the slot installed in the PC card interface.

Currently, there are already several PC card interface units connectable to the desktop PC, such as a type using a parallel port equipped as a standard in the PC, a PC card drive device with the SCSI (Small Computer System Interface) connection, or a PC card drive device using a dedicated interface board by inserting in a PCI slot of the PC. Though the PC card drive device having a parallel port connection or the SCSI connection can mainly use only a memory card among the PC cards, the drive device using the dedicated interface can basically use all kinds of PC cards as is the case of the PC card interface equipped as a standard in the portable compact PC.

Thus, the PC card drive device is required to be built in the information processing drive to use the PC card in the information processing device not equipped with the PC card interface, therefore producing some problems. First problem is that advantages originally owned by the PC card to be easily detachable, flexible and compact are restricted. For example, after removing the PC card (memory card) having data recorded by a information processing device (a) equipped with the PC card interface from the information processing device (a) and then carrying it, when the contents in the PC card is attempted to be read by a information processing device (b) at another location, the contents recorded in the PC card can not naturally be read unless the PC card drive device is equipped in the information processing device (b). Though it is possible to carry the PC card drive device together with the PC card to avoid above disadvantages, it extremely damages the portability of the PC card.

On the other hand, the portability can be ensured by installing the PC card drive device in the information processing device (b) beforehand because only the transfer is required. However, when there are a plurality of the information processing devices (b), the installation of the PC card drive device to each information processing device (b) is required, and therefore the second problem being high cost and not economical is produced.

Further, since the installation of the dedicated driver software and the setting of boards are required to introduce the PC card drive device in the information processing device (b), the third problem being bothered with maintenance control of the information processing device is produced.

It is a principal object of the present invention to provide a PC card connectable to a plurality of information processing devices without losing the advantages being easily detachable, flexible, and portable originally owned by the PC card.

Another object of the present invention is to provide a PC card connectable to the information processing device which does not have the PC card drive device.

A further object of the present invention is to provide a PC card connectable to an interface installed beforehand as a standard in the information processing device.

The above objects are achieved by a PC card at least comprising a function block providing a predetermined function for the information processing device, a first interface section transferring a data between the function block and the first information processing device, and a second interface section having a different specification from the first interface section and transferring data between the function block and the second information processing device.

In the PC card of the present invention, for example, if the first interface section is designed to correspond to the existing PC card interface and the second interface section is structured to correspond to a interface which has a different specification from the PC card interface such as the USB interface, the PC card of the present invention can be used, without the connection of the PC card drive device, not only for the first information processing device having a connector for the PC card such a portable PC and digital camera but also for the second information processing device which ordinary does not have a connector for the PC card such as the desktop PC, therefore leading to an increase in portability and flexibility originally owned by the PC card. It should be noted that "transfer data" in this application does not mean only data which should be stored but also the data transmission of a wide variety of concepts including addresses, commands to the PC card, or request signals and the like sent from the PC card to the information processing device.

In the PC card of the present invention, the first interface section comprises the first physical layer interface physically connecting to the first information processing device, and the first interface control section arranged between the first physical layer interface and the function block. Further, the first interface section comprises a first supplementary circuit to realize a control procedure through the first interface control section between the first information processing device and function block. Furthermore, the first supplementary circuit is arranged between the function block and the first interface control section.

Also, in the PC card of the present invention, the second interface section comprises the second physical layer interface physically connecting to the second information processing device, and the second interface control section arranged between the second physical layer interface and the function block. The second interface section comprises the second supplementary circuit for realizing the control procedure through the second interface control section between the second information processing device and the function block. Further, the second supplementary circuit is arranged between the function block and the second interface control section.

In the PC card of the present invention, a plurality of signal lines are connected from the function block to the first and second interface sections, and at least a part of the signal lines is connected to both of the first signal lines connecting to the first interface section and second signal lines connecting to the second interface section, through the junction section as common lines. The common lines are data or address bus lines where the data signals or address signals which should be transferred between the first and second information processing device and the function block flow.

Thus, in the present invention, a part of a plurality of the signal lines connected from the function block to the first and second interface sections is, as the common signal lines, connected to both of the first interface section and the second interface section through the junction, thereby realizing a PC card having a plurality of kinds of interfaces in a simple circuit structure. Further, the first and second supplementary circuits have functions to take out the control commands, data and the like for the function block from data received from the first or second interface control section, or to convert the data and control information received from the function block to the format of the first or second interface control section. Further, the first or second supplementary circuit has functions to absorb a difference of speed between the first or second control section and the function block with buffer processing or WAIT operation, or to convert a difference in bus signal formats between the first or second interface control section and the function block by a parallel/serial converter and so on.

Furthermore, the PC card of the present invention comprises a means for switching which selects one of the first and second interface sections and connects the selected one to the function block. The means for switching also comprised a signal line switching section to electrically connect one of the first signal lines and the second signal lines to the common signal lines. Further, the signal switching section connects electrically the common signal lines to only one of the first signal lines and second signal lines, on the basis of a first power source voltage supplied from the first information processing device to the first interface section and a second power source voltage supplied from the second information processing device to the second interface section. Also, when both of the first power source voltage and the second power source voltage are simultaneously supplied, the signal line switching section comprises a switching circuit to select one of the first signal lines or second signal lines to electrically connect to the common signal lines. In the PC card of the present invention, the signal line switching section sets one of the first signal lines or the second signal lines, which is not electrically connected to the common signal lines, relatively in the state of a high impedance.

So, in the present invention, when data are transferred between the function block and the first or second interface section through the common signal lines, the signal lines on the side of interface section which should be in a deactivated state without data transfer can be maintained in the state of the high impedance, therefore it is possible to easily and surely transfer the data to be transferred to the signal lines between the side of the interface section executing the data transfer and the function block.

Further, since the signal line switching section has a switching circuit to select one of the first signal lines or second signal lines electrically connected to the common signal lines when both of the first power source voltage and the second power source voltage are supplied, data to the first and second information processing device can be alternatively transferred by relatively easy switching of the connection even if the PC card is connected to both of the first and second information processing devices. No problem is introduced even if the interface does not have a dynamic means for setting of plug & play because recognition can be made by a reset processing from software operating in the information processing device.

Also, the PC card of the present invention comprises a power source control circuit in which the means for switching controls a voltage supplied to the first and second interface sections to deactivate either one of the first or second interface sections.

According to the present invention, when the state, in which each of the first and second interface sections are connected to each of the first and second information processing devices, arises, one of the interface sections is maintained in the activated state and the other of the interface sections is maintained in the high impedance state, therefore data to be transferred can be transferred easily and surely when the data is transferred between the side of the interface section in the high impedance state and the function block.

Further, in the PC card of the present invention, the second interface section corresponds to the USB standard. Or, the second interface section corresponds to the IEEE1394 standard.

Also, in the PC card of the present invention, the function block provides a data storage function to the first and second information processing devices. Or the function block provides a data communication function to the first and second information processing devices.

BRIEF DESCRIPTION OF THE DRAWINGS

The present invention is further described in connection with the accompanying drawings, in which:

FIG. 1 shows a schematic structure of the PC card in the first embodiment of the present invention;

FIG. 2 shows a schematic structure of the PC card in the second embodiment of the present invention;

FIG. 3 shows a schematic structure of the PC card in the third embodiment of the present invention.

DESCRIPTION OF THE PREFERRED EMBODIMENTS

First Embodiment

Figure 4:
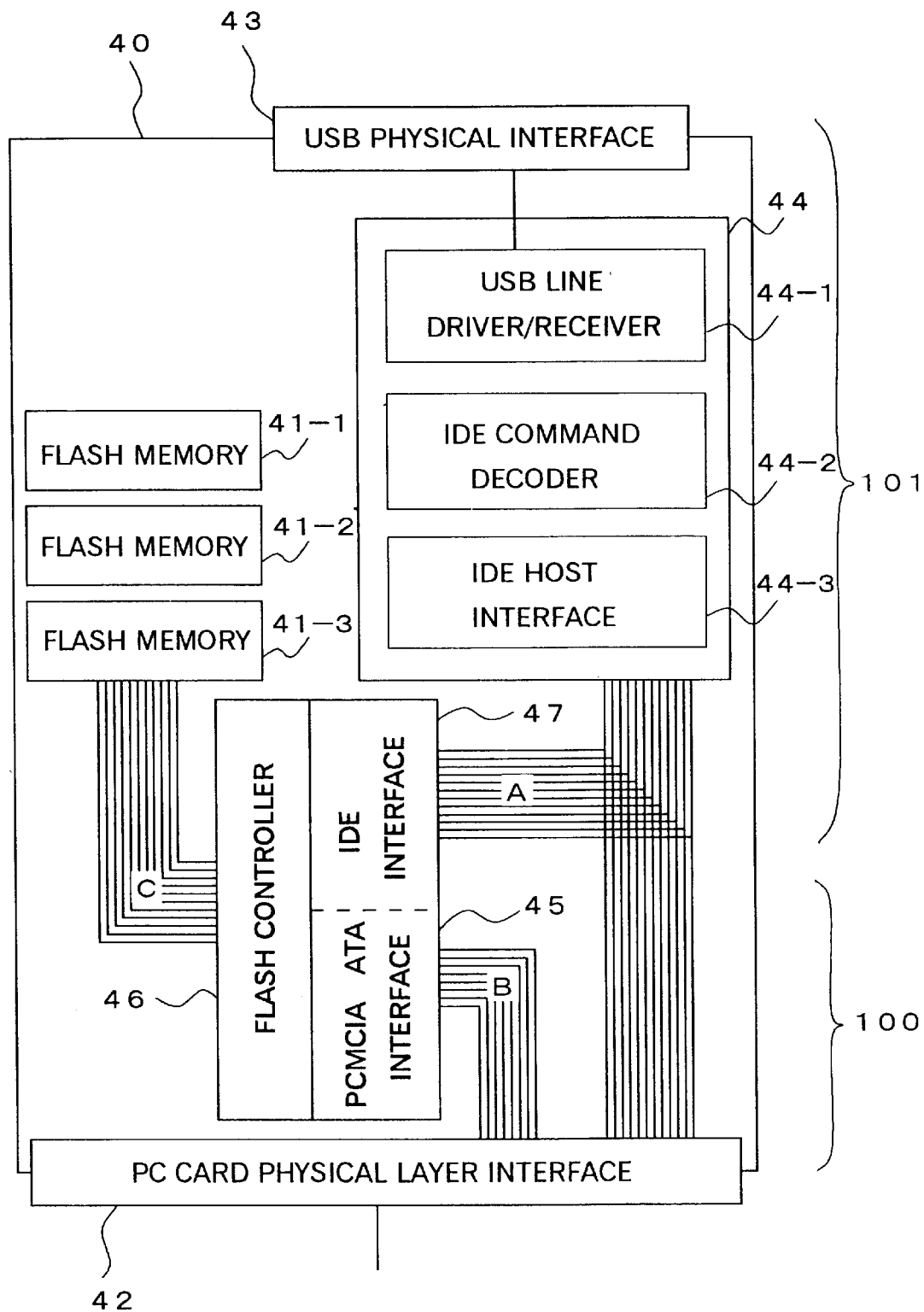
FIG. 4 shows a schematic structure of the PC card in the fourth embodiment of the present invention.

FIG. 1 illustrates a PC card with reference to a first embodiment of the present invention. In the first embodiment, a PC card based on the PCMCIA standard is described as an example. FIG. 1 is a plan view illustrating an internal schematic structure of the PC card 1 with a plurality of blocks.

As is illustrated in FIG. 1, the PC card 1 has a function block 2 providing a predetermined function to the information processing device. The function block 2 can provide one or combined functions of a variety of functions such as a memory function, modem function or LAN function to the information processing device. Also, the PC card 1 has a first interface section 100 to transfer data between, for example, a portable PC (omitted in FIG. 1) and the function block 2 as a first information processing device. The omitted portable PC in FIG. 1 is assumed to have the PC card interface therein. So, in the first embodiment, the first interface section 100 has, as a first physical layer interface 3, a PC card physical layer interface physically connecting to the PC card interface in the portable PC and, as a first interface control section 4, a PC card interface between the first physical layer interface 3 and the function block 2.

The PC card 1 also has a second interface section 101 to transfer data between a desktop PC 10 being as a second information processing device and the function block 2. It should be noted that the desktop PC 10 is assumed not to have the PC card interface. Therefore, the second interface section 101 is a different interface specification from the first interface section 100. The second interface section 101 has a second physical layer interface 6 connected to the desktop PC 10 through a connecting cable 11, and a second interface control section 7 arranged between the second physical layer interface 6 and the function block 2.

Further, the second interface section 101 has a second supplementary circuit 8 between the desktop PC 10 and the function block 2 to realize a control procedure through the second interface control section 7. The second supplementary circuit is arranged between the function block 2 and the second interface control section 7.

Now, in the PC card 1 of the first embodiment, a plurality of signal lines 102, 104, 106, 108 and 110 are connected from the function block 2 to the first and second interface sections 100 and 101. At least a part of a plurality of lines from 102 to 110 diverges at the junction section 112 illustrated by dotted lines in FIG. 1 as common signal lines 106, and then connects to both of the first signal lines 108 connecting to the first interface control section 4 which is a PC card interface control section of the first interface section 100 and the second signal lines 110 connecting to the second supplementary circuit 8 of the second interface section 101. The common signal lines 106 and the first and second signal lines 108 and 110 in this embodiment are used as data or address bus lines, where the data signals or address signals flow to be transferred between the portable PC (omitted in FIG. 1 ) and the function block 2 and between the desktop PC 10 and the function block 2. Also, the signal lines 102 which connect the function block 2 to the first interface control section 4, and the signal lines 104 which connect the function block 2 to the second supplementary circuit 8, both of them are illustrated by the dotted lines in FIG. 1, function as control signal lines to transfer the control signals to control the function block 2 respectively.

Next, an operation of the PC card with reference to the present embodiment will be described. First, the second interface control section 7 executes an error detection and a protocol processing and so on, for example, for serial data which are input from the desktop PC 10 through the second physical layer interface 6, or controls to recognize the PC card 1 as a device from the side of the desktop PC 10. At this time, to realize the control procedure through the second interface control section 7 between the desktop PC 10 and the function block 2, the second supplementary circuit 8 converts the data transmitted from the function block 2 to the suitable data for the second interface control section 7, converts data or commands, which are transmitted from the desktop PC 10 and executed a parallel conversion through the second physical layer interface 6 and the second interface control section 7, in a format understandable at the function block 2, or converts them for an electrical interface suitable to the function block 2.

When the PC card 1 is used connecting to the desktop PC 10, if the desktop PC 10 has, for example, the USB (Universal Serial Bus) which is recently becoming a de facto standard, the data can be transferred by using the USB interface as the second interface control section, by providing a connector for the USB or an entry for a connecting cable for the USB, and by connecting the PC card 1 to the desktop PC 10 with a connecting cable 11 or a wireless communication device such as an infrared.

Also, when the PC card 1 is used in the portable PC, the PC card can be used with the similar operability as the conventional PC card by inserting 68 pins of the PC card physical layer interface 3 of the PC card 1 in the slot of the PC card drive device provided in the Portable PC to connect.

It should be noted that although the first embodiment is described by exemplifying the PC card having the PC card interface based on the PCMCIA standard as the first interface section 100, the above mentioned other PC card interfaces such as interfaces used for the "compact Flash (the registered trademark of Sandisk Corporation)", the "Small PC Card", the "Miniature Card", the "SmartMedia (the registered trademark of Toshiba Corporation)", "MMC (MultiMedia Card)", or the "Memory stick (the trademark of Sony Corporation)" can be provided in the first interface section 100.

Also, in the first embodiment, the common signal lines 106 are diverged at the junction section 112 to connect to the first and second interface sections 100 and 101, and therefore achieving a reduction in change of design of the conventional existing function block and the first interface section 100 (the PC card interface in the first embodiment) as much as possible and providing the second interface section 101 in a compact circuit structure. Also, if the whole PC card 1 is newly designed, signal lines directly connected from the function block 2 to the first and second interface sections 100 and 101 can be provided without the use of the common signal lines 106.

Further, FIG. 1 illustrates the structure to transfer the data only between the function block 2 and the two information processing devices through the first and second interface sections 100 and 101, where the function block 2 is intended to have a memory card and the like having a memory function. When the function block 2 has functions such as a modem function or a LAN function, a connector or mounting opening corresponding to the Modem and LAN can be formed at a different location (for example, the left side of the interface 6, ) from the second physical layer interface 6 of the PC card 1 in FIG. 1 to connect predetermined signal lines from the function block 2 to the connector and the like. And a variety of setting information and processing procedure are provided from the information processing device to the PC card 1 through the first and second interface sections 100 and 101, and then the function block 2 exercises the desired function based on the setting information and processing procedure.

Further, though the above first embodiment is described using a combination of two interfaces, the PC card interface and the second interface section, more interfaces can be mounted in the PC card.

Furthermore, in the PCMCIA standard and USB standard, the power source voltage (Vcc) driving each circuit in the PC card 1 is supplied from the host side (the side of the information processing device) through the interface. For example, when the PC card 1 of the first embodiment is connected to a serial port (such as RS232C) or an infrared communication port (such as IrDA) which are not installed with a power source line, other external battery can be used or a power source can be installed in the PC card 1. Also, for example, a power source voltage can be supplied from a connecting cable for the keyboard connector of the desktop PC 10 to the PC card 1 by modifying the connecting cable connecting the body of the desktop PC 10 to a keyboard, and by connecting a specific connector for the power source outlet to the connecting cable. In this way, for example, the PC card 1 of the first embodiment can be used for an information processing device with a small feeding ability such as consumer audio equipment or information terminal equipment by supplying only a power source from the desktop PC 10 even for the case of the PC card 1 having a relatively large consumption power.

As has been previously described, since the PC card of the first embodiment is structured to be able to correspond to a plurality of interfaces with different specifications without being limited to the PC card interface, the PC card can be used, without a connection of the PC card drive device, not only for the information processing device such as a portable PC or digital camera having a connector for the PC card but also for the information processing device which does not include a PC card interface as a standard such as a desktop PC, therefore increasing a portability and flexibility the PC card originally owns.

Second Embodiment

Next, a PC card of the present invention will be described with reference to the second embodiment in FIG. 2. The second embodiment is described by exemplifying a PC card based on the standard of the PCMCIA similar to the first embodiment. FIG. 2 is a plan view illustrating an internal schematic structure of a PC card 20 with a plurality of blocks. The same code is designated to the structure element which has the same functional operation as the structure element of the PC card 1 of the first embodiment in FIG. 1 to omit detailed descriptions.

The PC card 20 of the second embodiment provides a signal switching section as a means of switching to select one of the first and second interface sections 100 and 101 to connect the selected one to the function block 2. The signal switching section has a multiplexer 21 to electrically connect the common signal lines 106 to one of the first signal lines 108 and the second signal lines 110. The multiplexer 21 is arranged at the junction section 112 on the signal lines in FIG. 1. Also, the signal switching section has a multiplexer control circuit comprising a switch 23 and a bus selector control logic 24 structured with an integrated circuit. The switch 23 and the bus selector control logic 24 are positioned on the left side of the second physical layer interface 6 in FIG. 2. One of the two terminals of the switch 23 is grounded (ground potential) and the other is connected to an input terminal of the bus selector control logic 24. Both terminals of the switch 23 come to a closed state (ON) with a connection between the terminals by pushing a switching button 118 projecting out of the body of equipment of the PC card 20, and both terminals of the switch 23 come to an open state (OFF) with disconnection between them by pulling up the switching button 118.

An arrangement of the power source lines in the PC card will be described here. The power source line 120 is connected to a pin terminal among the 68 pin terminals of the first physical layer interface 3 which is a PC card physical layer interface, where a power source voltage Vcc1 is supplied to the pin terminal. The power source line 120 supplies a power to the function block 2 by being connected to the function block 2 and is also connected to other input terminal of the bus selector control logic 24. On the other hand, a power source voltage Vcc2 from the second physical layer interface 6 is supplied to the power source line 124, and the power source line 124 supplies the power to the function block by being connected to the function block 2 as well as the power source line 124 is connected to other input terminal of the bus selector control logic 24.

Also, an output line of the bus selector control logic 24 is connected to the bus switch enable pin BX of the multiplexer with a signal line 126.

Based on the first power source voltage Vcc1 supplied from the portable PC omitted in FIG. 2 to the first interface section 100 and the second power source voltage Vcc2 supplied from the desktop PC to the second interface section 101, the signal switching section having a arrangement structure as described above forms a state of electrically non-connection by maintaining one of the first signal lines 108 and the second signal lines 110 relatively in a high impedance state to the common signal lines 106, and operates to connect the other signal lines to the common signal lines 106. Further, the switch 23 of the signal line switching section is used to select one of the first signal line 108 and the second signal line 110 when both of the first power source voltage Vcc1 and the second power source voltage Vcc2 are supplied. They will be later described in detail.

Next, the operation of the PC card 20 will be described with reference to the second embodiment. It should be noted that the information processing devices are connected to the first and second interface section 100 and 101 respectively. In short, the first physical layer interface 3 is inserted in the slot of the PC card drive device, for example the PC card slot installed in the notebook PC or the PC card drive device of the external type, in the portable PC omitted in FIG. 2, and the second physical layer interface 6 is connected, as illustrated in FIG. 1, to the UBS connector in the desktop PC through the connecting cable 11. In such a case, it is required to select which information processing device is used with the PC card 20 for a data transfer. It is also required that the data transfer is not affected by the other interface section when the date is under transfer at one interface section.

Therefore, when the second interface control section 7 and the second supplementary control circuit 8 are not used, the second signal lines 110 connected to the second supplementary circuit 8 must be maintained in a high impedance state to the first interface control section 4. Or, on the contrary, when the first interface control section 4 is not used, the first signal lines 108 connected to the first interface control section 4 must be maintained in a high impedance state to the second supplementary circuit 8.

When a High (H) voltage is applied to a bus switch enable pin BX of the multiplexer 21, in short when a signal "1" is output from the bus selector control logic 24, the multipexer 21 of the first embodiment sets the side of the second signal lines 110 in a high impedance state, and thereby connecting the common signal lines 106 from the function block 2 to the first signal lines 108 on the side of the first interface control section 4. Also, when a Low (L) voltage is applied to the bus switch enable pin BX, in short when a signal "0" is output from the bus selector control logic 24, the multiplexer 21 sets the side of the first signal lines 108 in a high impedance state, and thereby connecting the common signal lines 106 to the second signal line 110 on the side of the second supplementary circuit 8. Table 1 illustrates a table of true value showing the operation of the bus selector control logic 24.

TABLE 1

Table of true value of a bus selector-control logic

| Selected interface | (2) | (1) | (2) | (1) |
|---|---|---|---|---|
| Vcc1 | 0 | 1 | 1 | 1 |
| Vcc2 | 1 | 0 | 1 | 1 |
| SW | X | X | L | Hiz |
| OUT | 0 | 1 | 0 | 1 |

In table 1, (1) indicates the first interface section 100, where (2) indicates the second interface section 101. "SW" indicates a level of the switching signal inputting in the bus selector control logic 24, where "L" indicates a low state due to a ground voltage applied by closing (ON) the switch 23, and "Hiz" indicates a high state (a high impedance state) due to the open state of the switch 23. As is clear from the table of true value, when the power source voltage Vcc1 is input from the portable PC and the power source voltage Vcc2 is input from the USB connector of the desktop PC or from aforementioned keyboard connecting cable, the signal "0" is output at an output terminal (OUT) by closing (ON) the switch 23 to set the input (SW) of the bus selector control logic 24 in a low state (L), and a signal "1" is output at the output terminal (OUT) by opening the switch 23 to set the input (SW) of the bus selector control logic 24 in the high state (HiZ).

Whether the switch is in high state or in low state, when Vcc1 is applied and Vcc2 is not applied, the signal "1" is output from the output terminal (OUT) of the bus selector control logic 24. On the other hand, when Vcc2 is applied and Vcc1 is not applied, the signal "0" is output.

Thus, in the open state of the switch 23 as illustrated in FIG. 2, when the side of the first physical layer interface 3 of the PC card 20 is inserted in the slot of the PC card drive device of the portable PC and when the second physical layer interface 6 is connected to the USB connector of the desktop PC 10 by the connecting cable 11 in FIG. 1, the power source voltage Vcc2 is input from the desktop PC 10 to the bus selector control logic 24 through the second physical layer interface 6. Since the switch 23 is in the open state, input (SW) at the bus selector control logic 24 is in a high state (HiZ), therefore outputting a signal "1" at the output terminal (OUT) to input it in the bus switch enable pin BX of the multiplexer 21. The multiplexer 21 sets the side of the second supplementary circuit 8 in the state of high impedance to switch the connection of the common signal lines 106 from the function block 2 to the side of the first interface control section 4. In this way, for example, even if the PC card 20 is connected to both of the portable PC and desktop PC, only the data transmission from the portable PC to the PC card 20 is executed, but the access from the desktop PC to the PC card 20 is not executed.

To make it possible for the desktop PC to access to the PC card 20 from this state, the switch 23 is switched to closed state (ON). In this way, the input (SW) of the bus selector control logic 24 is set in the low state (L) to output a signal "0" at the output terminal (OUT), then inputting the signal to the bus switch enable pin BX of the multiplexer 21. The multiplexer 21 sets the side of the first interface control section 4 in the high impedance state to switch the connection of the common signal lines 106 from the function block 2 to the side of the second supplementary circuit 8. Thus, the PC card 20 is set in a connecting state to the desktop PC connected to the second physical layer interface 6, so that the access from the portable PC to the PC card 20 is not possible. It should be noted that no problem is introduced when the interface does not have a dynamic setting means by plug & pay because a recognition can be made by resetting from the software operating in the information processing device.

Third Embodiment

Next, A PC card of the present invention will be described with reference to the third embodiment in FIG. 3. The third embodiment is also described by exemplifying the PC card based on the PCMCIA standard similar to the first and second embodiments. FIG. 3 is a plan view illustrating an internal schematic structure of the PC card 30 with a plurality of blocks. The same code is designated to the structure element having the same functional operation as the structure element in the PC cards 1 and 20 in the first and second embodiments illustrated in FIG. 1 and FIG. 2 to omit detailed descriptions. The illustration of the common signal lines from the function block 2 and the signal lines (including the control signal lines) connected to the first and interface sections 100 and 101 is omitted in FIG. 3.

The PC card 30 of the third embodiment provides a power source control circuit 31 as a switching means to select one of the first and second interface section 100 and 101 and to connect the selected one to the function block 2. The power source control circuit 31 controls a voltage Vcc1-in and a voltage Vcc2-in supplied to the first interface section 100 and the second interface section 101 to operate to deactivate one of the first and second interface sections 100 and 101. Also, the first interface section 100 of the PC card 30 of the third embodiment has the first supplementary circuit 5 between the first interface control section 4 and the function block 2.

The illustrated voltage "Vcc1-in" in FIG. 3 shows that the power source voltage Vcc1 from the first interface control section 4 inputs in the power source control circuit 31. Notation "in" and "out" show an input and output of the power source control circuit 31. For example, "Vcc1-in" shows that a power source voltage Vcc1 inputs in the power source control circuit 31 and the "Vcc1-out" shows that the power source voltage Vcc1 is output from the power source control circuit 31.

The power source control circuit 31 of the third embodiment outputs the voltage Vcc1 and voltage VccF when the power source voltage Vcc1 is input and the voltage Vcc2 and voltage VccF when the power source voltage Vcc2 is input. When both of the power source voltages Vcc1 and Vcc2 are input, the power source control circuit 31 is structured to output the Vcc1 and VccF. It should be noted that the VccF is a voltage supplied to the function block 2.

When the PC card 30 is inserted in the slot of the PC card drive device in the portable PC, the power source voltage Vcc1 is input from the first interface control section 4 to the power source control circuit 31. In this way, the power source voltage Vcc1 is output from the power source control circuit 31 to the first supplementary circuit 5, and the power source voltage VccF is output to the function block 2. Thus, the function block 2 and the first supplementary circuit 5 are set in the deactivate state, so that an access from the portable PC to the PC card 30 can be executed.

Also, when the PC card 30 is not inserted in the slot of the PC card drive device of the portable PC and the second physical layer interface 6 is connected to the USB connector of the desktop PC, the power source voltage Vcc2 is input from the second interface control section 7 to the power source control circuit 31. Therefore, the power source voltage Vcc2 is output from the power source control circuit 31 to the second supplementary circuit 8, while the power source voltage VccF is output to the function block 2. Thus, the function block 2 and the second supplementary circuit 8 are activated to access from the desktop PC to the PC card 30.

When the PC card 30 is inserted in the slot of PC card drive device of the portable PC and the second physical layer interface 6 is connected to the USB connector in the desktop PC, the power source voltage Vcc1 is input from the first interface control section 4 to the power source control circuit 31, and also the power source voltage Vcc2 is input from the second interface control section 7. At this time, as has been previously described, the power source control circuit 31 outputs the power source voltage Vcc1 to the first supplementary circuit 5 and the power source voltage VccF to the function block 2, so that the function block 2 and the first supplementary circuit 5 are activated and the second interface section 101 is deactivated.

Thus, in the third embodiment, when the data is transferred between the function block 2 and the first or second interface section 100 or 101, the power source control circuit 31 is provided to supply the power only to the side of the interface section which transfers the data and to the function block 2 without a supply of the power to the side of the interface which should be in the deactivated state not to transfer the data, and therefore the data to be transferred can be easily and surely transferred as well as the switching of the activation or deactivation of the interface can be executed by a simpler structure than a complex multiplexer in structure.

Further, in the third embodiment, when the information processing devices are connected to the first and second interface sections 100 and 101, it is decided that the right to access is given to the information processing device connected to the first interface section 100. However, without being limited to this, for example, the PC card 30 can be structured to allow the information processing device connected earlier to have the priority to access to it, or the user can transfer the data alternatively to the portable PC and desktop PC by connecting arbitrarily even if the PC card 30 is connected to both of the portable PC and desktop PC by providing a switch circuit such as one illustrated in the second embodiment.

Fourth Embodiment

Next, a PC card of the present invention will be described with reference to the fourth embodiment in FIG. 4. In the fourth embodiment, the PCMCIA ATA (AT Attachment) card recently widely used as a storage media of the digital-still-camera and portable terminal is described as an example. FIG. 4 is a plan view illustrating an internal schematic structure of a PC 40 with a plurality of blocks.

FIG. 4 illustrates that the first interface section 100 has a PCMCIA ATA interface 45 together with a PC card physical layer interface 42 while the second interface section 101 has a USB physical layer interface 43, a USB interface 44, and an IDE (Integrated Drive Electronics) interface 47. These first and second interface sections 100 and 101 are connected to a flash controller 46.

Among a plurality of signal lines A and B connected from the PCMCIA ATA interface 45 to the PC card physical layer interface 42, the common signal lines A which are the data or address lines are connected also to the USB interface 44 after divergence. The desktop PC can be accessed to the PC card (the PCMCIA ATA Card) 40 by being connected from the USB interface 44 to the USB port of the desktop PC through the USB physical layer interface 43 and the connecting cable.

As is illustrated in FIG. 4, the PC card 40 provides flash memories 41-1, 41-2, and 41-3. These flash memories 41-1, 41-2, and 41-3 are connected to the flash controller 46 arranged between the flash memory 41-3, the PCMCIA ATA interface 45 and the IDE interface 47 by control signal lines C.

Further, a USB line driver/receiver 44-1, an IDE command decoder 44-2, and an IDE host interface 44-3 are provided in the USB interface 44.

A driver/receiver is provided in the PCMCIA ATA interface 45 to connect the common signal lines A and the non-common signal lines B to the PC card physical layer interface 42, where the common signal lines A share the lines with the IDE interface 44-3 but the non-common signal lines B do not share the lines with the IDE interface 44-3.

The flash controller 46 operates as a PC card interface and decodes input signals input to the common signal lines A and non-common signal lines B. Also, based on the decoded input signal, the flash controller 46 executes the processing to the flash memory 41-1~41-3 through control signal lines C, or executes a processing to the flash memory 41-1~41-3 with a control signal transmitted through the common signal lines A based on a result decoded by the IDE command decoder 44-2.

Signal lines of the USB interface 44 will be described with reference to Table 2. As is illustrated in Table 2, the signal lines of the USB interface 44 provide a power source voltage Vcc=5V, differential data signal lines D+ and D–, and a grounding line. It should be noted that the USB physical layer interface 43 in the PC card 40 has two connection ports for serial connections with other peripheral devises.

TABLE 2

Specification of the USB interface signal lines

| VBus | Normal Value 5 V |
|---|---|
| D+ | Data (+) |
| D– | Data (–) |
| GND | ground |

The control signals are transmitted through the PC card physical layer interface 42 when the PC card 40 is inserted in the slot of the PC card driving device in the portable PC. Among the control signals, the control signals shared with the IDE host interface 44-3 are transmitted to the common signal lines A, where unshared control signals are transmitted to the non-common signal lines B. The control signals transmitted to the common signal lines A and non-common signal lines B are decoded at the flash controller 46 through the PCMCIA ATA interface 45, and a processing corresponding to the decoded control signals is executed at the flash memories 41-1~41-3. Data resulted from the processing at the flash memories 41-1~41-3 are transmitted from the flash controller 46 to the PCMCIA ATA interface 45, and then transmitted to the portable PC through the PC card physical layer interface 42. In this way, the PC card 40 can be operated as the PCMCIA ATA card.

On the other hand, when the connector of the USB connecting cable connected to the USB port in the desktop PC and the USB physical layer interface 43 of the PC card 40 are connected, the control signals (serial signals) from the desktop PC are received at the receiver of the USB line driver/receiver 44-1 after they are input, and then a serial/parallel conversion of the control signals is executed. After the control signals converted to the parallel signals are decoded at the IDE command decoder 44-2, they are output to the common signal lines A through the IDE host interface 44-3. The control signals output to the common signal lines A are transmitted to the flash controller 46 through the IDE interface 47, and then a predetermined processing is executed to the flash memories 41-1~41-3. From the operation described above, the PC card 40 can be operated as the IDE drive connected to the USB port in the desktop PC.

Also, in the PC card of the fourth embodiment, the connection with the information processing device can be executed by the wireless connection such as an infrared transmission, or by receiving the power source lines from the connecting cable of the desktop PC.

Furthermore, in the PC card of the above first through fourth embodiments, the second interface section 101 is described as being corresponding to the USB standard. However, for example, the second interface section 101 of the PC card 1, 20, 30, and 40 of the above embodiments can be an interface corresponding to the IEEE1394 standard as long as the desktop PC has a interface and connector corresponding to the IEEE1394 standard.

As has been previously described, the present invention can realize a PC card connectable to a plurality of information processing devices without losing the advantages of easy detachability, flexibility and portability of the PC card originally owned by the PC card. The present invention can also realize a PC card connectable to the information processing devices which do not have a PC card drive device. Further, the present invention can realize a PC card connectable to an interface pre-provided in the information processing devices as a standard.

What is claimed is:

1. A PC card comprising:

a function block providing a predetermined function for an information processing device;

a first interface section executing a data transfer between the function block and a first information processing device;

a second interface section having a different specification from the first interface section, the second interface section executing a data transfer between the function block and a second information processing device;

a plurality of signal lines having at least a first signal lines connected to the first interface section, a second signal lines connected to the second interface section, and a common signal lines connected to the function block by being commonly connected to both of the first and the second signal lines through a junction section, the plurality of signal lines connected from the function block to the first interface section and/or the second interface section; and a switching means for selecting one of the first or second interface section and connecting the selected one to the function block;

wherein the switching means has a signal line switching section to electrically connect the common signal lines to only one of the first or second signal lines on the basis of a first power source voltage supplied from the first information processing device to the first interface section and a second power source voltage supplied from the second information processing device to the second interface section.

2. A PC card as set forth in claim 1, wherein the signal line switching section has a switching circuit for selecting one of the first or second signal lines to electrically connect to the common signal lines when both of the first power voltage and the second power voltage are supplied.

3. A PC card as set forth in claim 1, wherein the signal line switching section sets one of the first signal lines or the second signal lines, which is not electrically connected to the common signal lines, relatively in the state of high impedance.

4. A PC card comprising:

a function block providing a predetermined function for an information processing device;

a first interface section executing a data transfer between the function block and a first information processing device;

a second interface section having a different specification from the first interface section, the second interface section executing a data transfer between the function block and a second information processing device;

a plurality of signal lines having at least a first signal lines connected to the first interface section, a second signal lines connected to the second interface section, and a common signal lines connected to the function block by being commonly connected to both of the first and the second signal lines through a junction section, the plurality of signal lines connected from the function block to the first interface section and/or the second interface section; and a switching means for selecting one of the first or second interface section and connecting the selected one to the function block;

wherein the switching means has a signal line switching section setting one of the first signal lines or the second signal lines, which is not electrically connected to the common signal lines, relatively in the high impedance state.

5. A PC card comprising:

a function block providing a predetermined function for an information processing device;

a first interface section executing a data transfer between the function block and a first information processing device;

a second interface section having a different specification from the first interface section, the second interface section executing a data transfer between the function block and a section information processing device;

a plurality of signal lines having at least a first signal lines connected to the first interface section, a second signal lines connected to the second interface section, and a common signal lines connected to the function block by being commonly connected to both of the first and the second signal lines through a junction section, the plurality of signal lines connected from the function block to the first interface section and/or the second interface section; and a switching means for selecting one of the first or second interface section and connecting the selected one to the function block;

wherein the switching means has a power source control circuit to deactivate one of the first or second interface sections by controlling voltages supplied to the first interface section and the second interface section.

* * * * *